United States Patent
Sang et al.

(10) Patent No.: US 10,434,713 B1
(45) Date of Patent: Oct. 8, 2019

(54) PRINTHEAD DEVICE FOR 3D BIO-PRINTER

(71) Applicant: Taiyuan University of Technology, Taiyuan Shi, Shanxi Sheng (CN)

(72) Inventors: Shengbo Sang, Shanxi Sheng (CN); Zhongyun Yuan, Shanxi Sheng (CN); Qiang Zhang, Shanxi Sheng (CN); Qianqian Duan, Shanxi Sheng (CN); Jianlong Ji, Shanxi Sheng (CN); Yixia Zhang, Shanxi Sheng (CN); Bo Zhang, Shanxi Sheng (CN); Wendong Zhang, Shanxi Sheng (CN)

(73) Assignee: TAIYUAN UNIVERSITY OF TECHNOLOGY, Taiyuan Shi, Shanxi Sheng (CN)

( * ) Notice: Subject to any disclaimer, the term of this patent is extended or adjusted under 35 U.S.C. 154(b) by 0 days.

(21) Appl. No.: 16/362,803

(22) Filed: Mar. 25, 2019

(30) Foreign Application Priority Data

May 15, 2018 (CN) .......................... 2018 1 0464323
May 17, 2018 (CN) .......................... 2018 1 0476124

(51) Int. Cl.
| | | |
|---|---|---|
| *B29C 64/255* | (2017.01) | |
| *B29C 64/393* | (2017.01) | |
| *B29C 64/209* | (2017.01) | |
| *B33Y 30/00* | (2015.01) | |
| *B33Y 50/02* | (2015.01) | |
| *B33Y 70/00* | (2015.01) | |

(52) U.S. Cl.
CPC .......... *B29C 64/255* (2017.08); *B29C 64/209* (2017.08); *B29C 64/393* (2017.08); *B33Y 30/00* (2014.12); *B33Y 50/02* (2014.12); *B33Y 70/00* (2014.12)

(58) Field of Classification Search
CPC ... B29C 64/255; B29C 64/393; B29C 64/209; B33Y 50/02; B33Y 30/00; B33Y 70/00
See application file for complete search history.

(56) References Cited

U.S. PATENT DOCUMENTS

| | | | |
|---|---|---|---|
| 2009/0051729 A1* | 2/2009 | Miyazawa | ........... B41J 2/16511 347/32 |
| 2018/0085825 A1* | 3/2018 | Ishida | ..................... B33Y 70/00 |
| 2018/0178224 A1* | 6/2018 | Nakamura | ................. B41J 2/04 |
| 2018/0243478 A1* | 8/2018 | Pang | ...................... B33Y 50/02 |

* cited by examiner

*Primary Examiner* — Joseph S Del Sole
*Assistant Examiner* — Mohamed K Ahmed Ali
(74) *Attorney, Agent, or Firm* — Jeffri A. Kaminski; Venable LLP

(57) ABSTRACT

A printhead device is provided. The printhead device includes a cell tube, a cell tube rubber plug covering the cell tube, a connector arranged at an end of the cell tube, and a fixing knob fixed to the connector and communicating with a printing nozzle through a bottom liquid tube. A fixing clip is provided on the upper part of the cell tube, and a stepping motor box is provided on the upper end of the fixing clip. An air valve box is arranged on the upper side of the stepping motor box, and a rotary air valve is provided in the air valve box. The rotary air valve communicates with the inner cavity of the cell tube through an internal vent tube, and with an air valve straight tube or an air valve gooseneck tube.

2 Claims, 5 Drawing Sheets

PRINTHEAD DEVICE FOR 3D BIO-PRINTER

CROSS REFERENCE TO RELATED APPLICATION

This patent application claims the benefit of Chinese Patent Application No. 201810464323.4, filed May 15, 2018, and Chinese Patent Application No. 201810476124.5, filed May 17, 2018, contents of which are incorporated by reference herein.

BACKGROUND

1. Technical Field

The present disclosure relates to 3D cell printing, and more specifically to an intelligent design which integrates the storage of cell liquid and a controllable printhead and which is used for a 3D bio-printer.

2. Introduction 3D bio-printer is an equipment capable of positioning and assembling biomaterials or cell units, and manufacturing products such as medical devices, tissue engineering scaffolds, and tissues and organs according to the principle of additive manufacturing driven by digital 3D modelling. The difference from a normal 3D printer lies in the printing materials, including a plurality of materials necessary to construct simulated organs such as cells, hydrogels, and collagen.

The cells, as one of the main raw materials used in 3D bio-printing, are stored in the form of cell liquid. In the 3D bio-printer, the printhead needs to be connected with a storage device for storing the cell liquid, and the cells need to be sent to the printhead by mechanical pressing. The cell storage devices used in existing 3D bio-printers are relatively simple. For example: the cell storage device used in the 3D printer developed by some companies is a simple plastic syringe, and it is impossible to exclude causes of a low cell printing survival rate caused by internal reasons of cell tubes in a complex 3D bio-printing environment. Moreover, when the cell liquid is used up, it is only possible to end the printing by turning off manually.

SUMMARY

The present disclosure overcomes the deficiencies in prior art, and provides a design integrating a biological cell liquid storage device and a controllable printhead, which can effectively solve the problem of a low cell printing survival rate, can automatically adjust the discharge mode, can control the temperature of the printhead, and can stop the printing process at any time.

In order to solve the aforementioned technical problems, the present disclosure adopts the following technical solutions: a cell liquid storage device for a 3D bio-printer includes a top vent tube, a stepping motor box, a fixing clip, an internal vent tube, a cell tube rubber plug, a cell tube, a connector, a fixing knob, a bottom liquid tube, an air valve box, a rotary air valve, an air valve straight tube, and an air valve gooseneck tube. The cell tube is a cylindrical structure with an opening at the top. The cell tube rubber plug is mounted covering the top of the cell tube in a matching manner and cooperates with the cell tube to form a closed cavity structure for storing cell liquid. A small outlet opening is provided at the bottom of the cell tube. The connector is arranged at an end of the outlet opening. One end of the fixing knob is fixed to the connector and the other end of the fixing knob communicates with a printhead through the bottom liquid tube. The fixing clip is provided on the upper part of the cell tube, and the lower end of the fixing clip is fixed to the side wall of the cell tube. The upper end of the fixing clip has a horizontal plate-like structure and is positioned above the cell tube rubber plug. The stepping motor box is provided on the upper end of the fixing clip. The air valve box is arranged on the upper side of the stepping motor box. The rotary air valve is provided in the air valve box. The lower end port of the rotary air valve communicates with the inner cavity of the cell tube through the internal vent tube and the upper end port of the rotary air valve communicates with the air valve straight tube or the air valve gooseneck tube. One end of the air valve straight tube can communicate with the upper end port of the rotary air valve and the other end of the air valve straight tube communicates with an air pump through the top vent tube. One end of the air valve gooseneck tube can communicate with the upper end port of the rotary air valve and the other end of the air valve gooseneck tube communicates with the external atmosphere. The rotating part of the rotary air valve is connected with an output end of a stepping motor positioned inside the stepping motor box, and the stepping motor drives the rotary air valve to switch the connection port between the air valve straight tube and the air valve gooseneck tube.

A semiconductor cooling plate and an electric heating sheet are provided at an outer side of the cell tube. A liquid level meter and a thermometer are provided in the inner cavity of the cell tube. A controller is provided inside the stepping motor box. The controller is connected to the liquid level meter and the thermometer respectively by a liquid level meter signal line and a thermometer signal tube. And the controller is electrically connected to the semiconductor cooling plate, the electric heating sheet, and the stepping motor inside the stepping motor box.

The present disclosure has the following advantages as compared with prior art. The stepping motor in the disclosure is used as an actuator for operating the air valve switch, and the disclosure adopts a structure of the air valve gooseneck, which can prevent the cell liquid in the cell tube from being contaminated by bacteria and impurities from the outside, and can also determine whether or not to print by controlling the internal air pressure of the cell tube by rotating the rotary air valve. The liquid level meter and the temperature sensor in the present disclosure are used as tools for sensing the liquid level and the temperature of the cell liquid. The electric heating sheet and the semiconductor cooling plate are provided as actuators for adjusting the temperature of the cell liquid. The upper cell liquid can reach the bottom liquid tube through the connector and reach the printhead connected externally. The discharge port generates pressure on the converging sheet. The pressure is transmitted to the compression spring through the converging sheet, and the compression spring is compressed, thereby achieving the purpose of controlling the opening diameter of the printing nozzle of the printhead. Also, an electric field is generated between the applied electric field electrode sheets on both sides of the discharge port to achieve the purpose of controlling the material discharge mode.

The controllable printhead is provided with three converging sheets, and compression springs arranged between the three converging sheets and the printhead housing, so that the opening diameter of the printing nozzle is variable, which avoids cell death due to an extremely small opening diameter of the printing nozzle in the printing process of biological materials such as cells. An electric field is applied by the electrode sheets, and the material discharge mode is controlled by the electric field, thereby realizing the consistency of the biological material discharge and improving the printing quality.

The present disclosure effectively solves the problem of a low cell printing survival rate, can automatically adjust the material discharge mode, can control the temperature of the printhead, and can stop the printing process at any time, which improves the printing quality.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present invention will be further described below with reference to the attached drawings.

DETAILED DESCRIPTION

Figure 1:
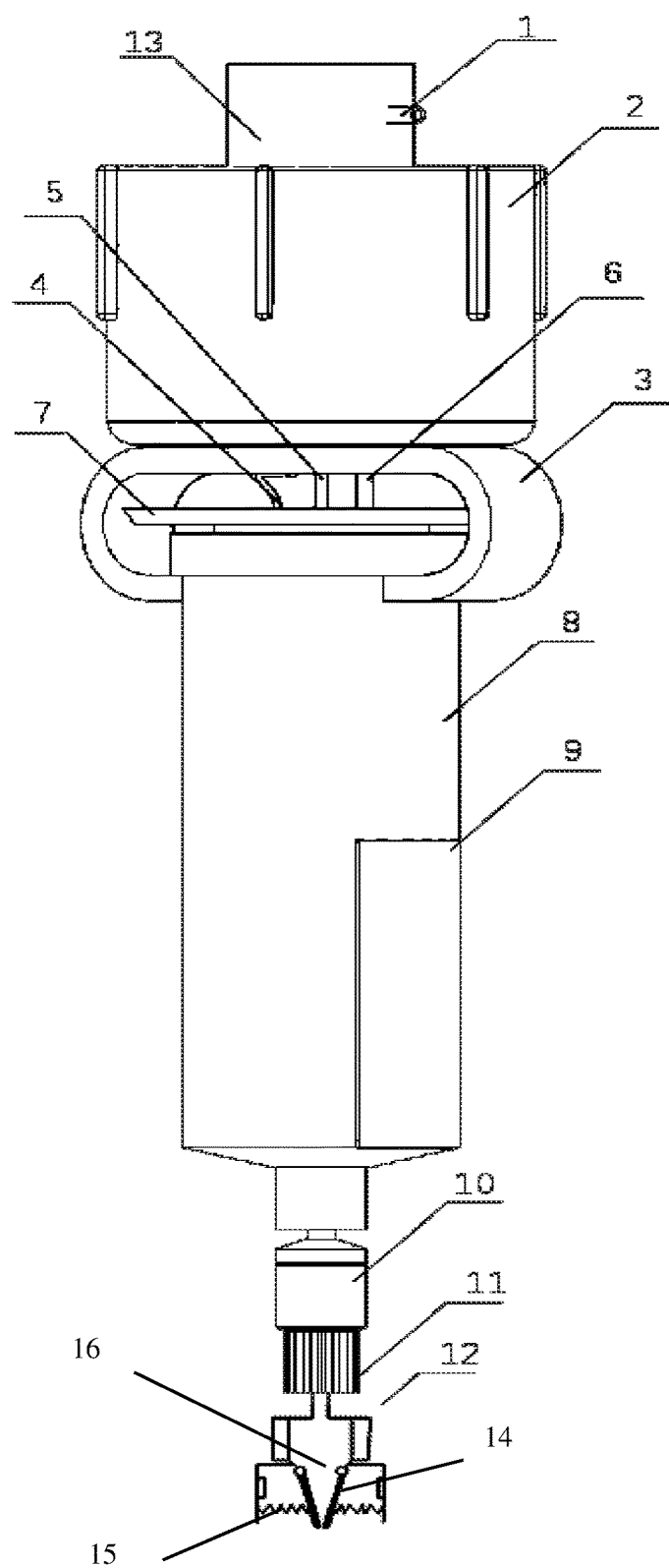
FIG. 1 illustrates is a schematic view of an example structure of the present invention.
Figure 2:
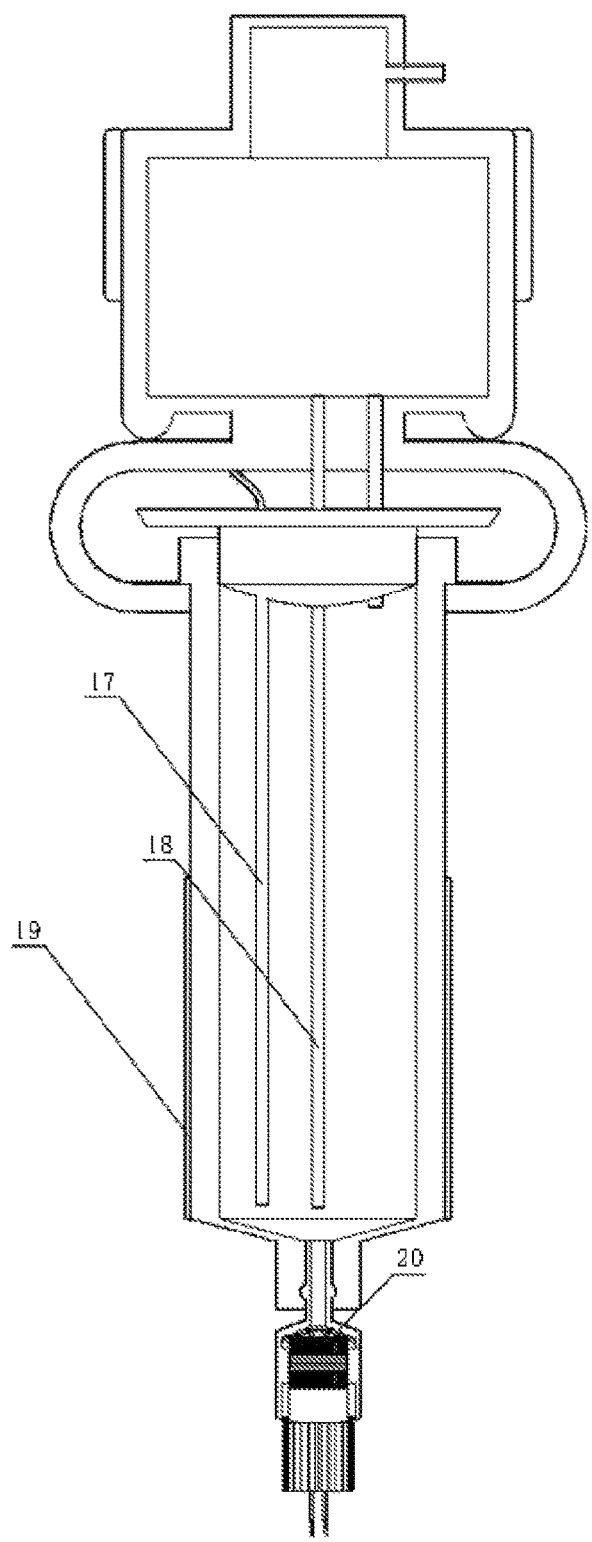
FIG. 2 illustrates a cross-sectional view of the example structure of the present invention.
Figure 3:
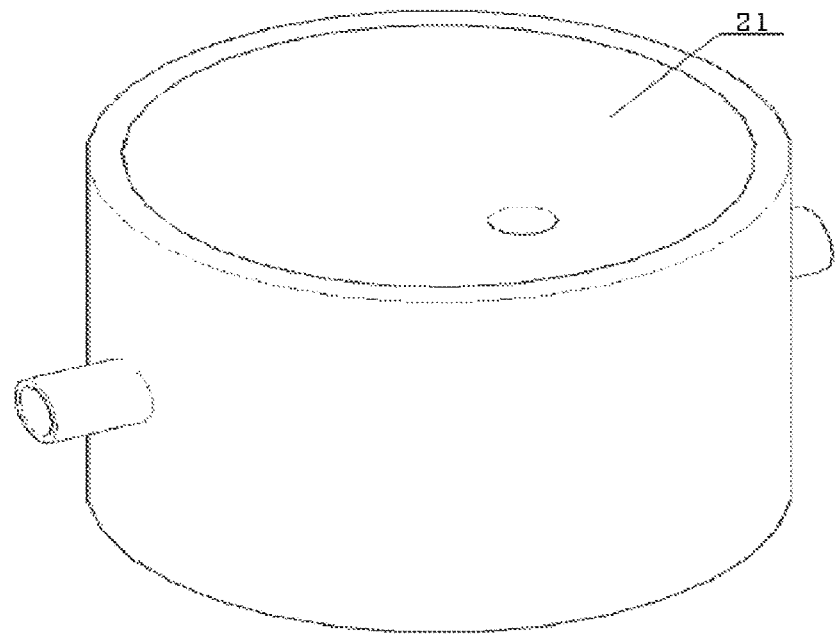
FIG. 3 illustrates a schematic view showing the outline of an example rotary air valve of the present invention.
Figure 4:
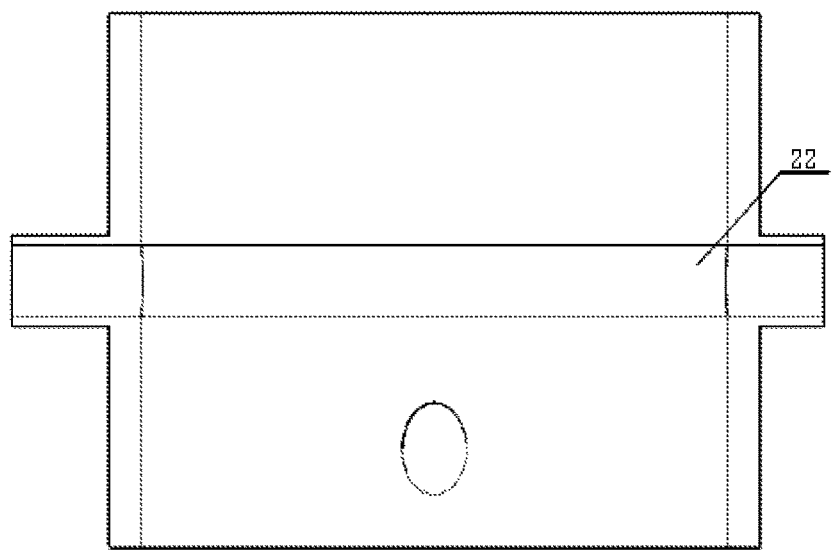
FIG. 4 illustrates a front cross-sectional view of the example rotary air valve of the present invention.
Figure 5:
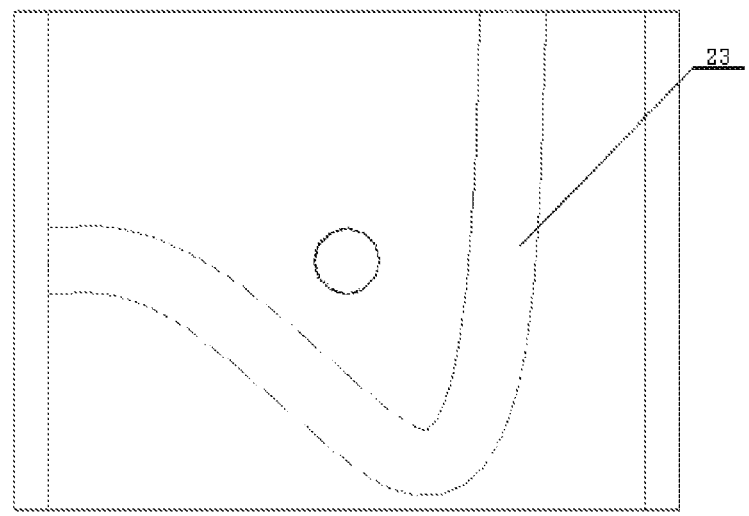
FIG. 5 illustrates a left side cross-sectional view of the example rotary air valve of the present invention.
Figure 6:
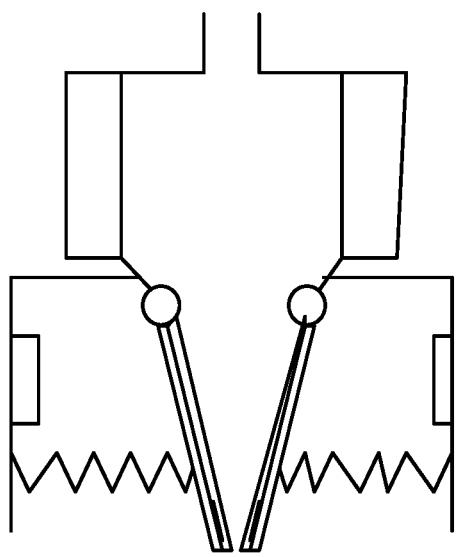
FIG. 6 illustrates a front cross-sectional view of an example printhead of the present invention.

As shown in FIGS. 1-7, the present disclosure relates to a cell liquid storage device for a 3D bio-printer. The cell liquid storage device may include a top vent tube 1, a stepping motor box 2, a fixing clip 3, an internal vent tube 6, a cell tube rubber plug 7, a cell tube 8, a connector 10, a first fixing knob 11, a bottom liquid tube 12, an air valve box 13, converging sheets 14, compression springs 15, a discharge port 16, a liquid level meter 17, a thermometer 18, an electric heating sheet 19, a second fixing knob 20, a rotary air valve 21, an air valve straight tube 22, and an air valve gooseneck tube 23.

The cell tube 8 may be a cylindrical structure with an opening at the top of the cell tube 8. The cell tube rubber plug 7 may be mounted covering the top of the cell tube 8 in a matching manner and cooperates with the cell tube 8 to form a closed cavity structure for storing cell liquid. A small outlet opening is provided at the bottom of the cell tube 8, and the connector 10 is arranged at the end of the outlet opening. One end of the fixing knob 11 is fixed to the connector 10 and the other end of the fixing knob 11 communicates with a printer nozzle of a printhead through the bottom liquid tube 12.

The fixing clip 3 may be provided on the upper part of the cell tube 8, and the lower end of the fixing clip 3 is fixed to the side wall of the cell tube 8. The upper portion of the fixing clip 3 has a horizontal plate-like structure and is positioned above the cell tube rubber plug 7. The stepping motor box 2 is positioned on the upper portion of the fixing clip 3. The air valve box 13 is arranged on the upper side of the stepping motor box 2. The rotary air valve 21 is provided in the air valve box 13.

The lower end port of the rotary air valve 21 communicates with the inner cavity of the cell tube 8 through the internal vent tube 6, and the upper end port of the rotary air valve 21 communicates with the air valve straight tube 22 or the air valve gooseneck tube 23. One end of the air valve straight tube 22 can communicate with the upper end port of the rotary air valve 21, and the other end of the air valve straight tube 22 communicates with an air pump through the top vent tube 1. One end of the air valve gooseneck tube 23 can communicate with the upper end port of the rotary air valve 21, and the other end of the air valve gooseneck tube 23 communicates with the external atmosphere.

A rotating part of the rotary air valve 21 may be connected with an output end of a stepping motor positioned inside the stepping motor box 2. The stepping motor drives the rotary air valve 21 to switch the connection port between the air valve straight tube 22 and the air valve gooseneck tube 23.

Figure 7:
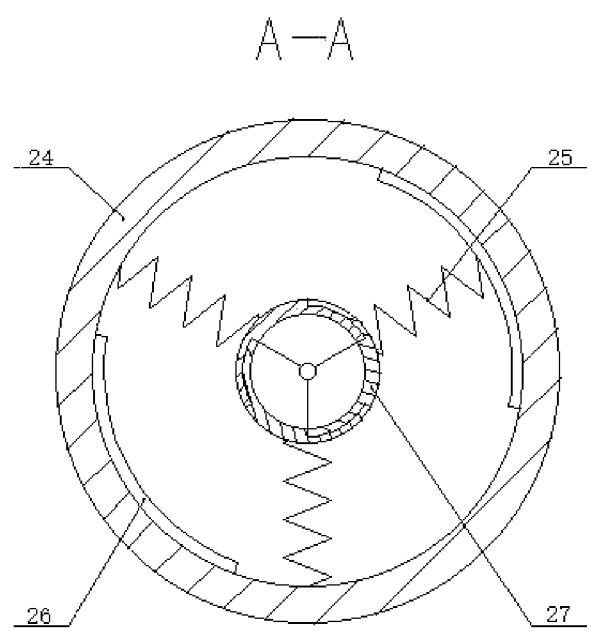
FIG. 7 illustrates a top cross-sectional view of the example printhead of the present invention.

FIG. 7 is a top view of the printhead including a printing nozzle. The printhead may include a bottom opening 24, compression springs 25, applied electric field electrode sheets 26, and converging sheets 27.

A semiconductor cooling plate 9 and an electric heating sheet 19 are provided at an outer side of the cell tube 8. The liquid level meter 17 and the thermometer 18 are provided in the inner cavity of the cell tube 8. A controller may be provided inside the stepping motor box 2. The controller may be connected to the liquid level meter 17 and the thermometer 18 respectively by a liquid level meter signal line 4 and a thermometer signal tube 5. The controller may be electrically connected to the semiconductor cooling plate 9, the electric heating sheet 19, and the stepping motor inside the stepping motor box 2.

The stepping motor in the disclosure is used as an actuator for operating the air valve. Further, the disclosure adopts a structure of the air valve gooseneck tube 23. This can prevent the cell liquid in the cell tube from being contaminated by bacteria and impurities from the outside, and can also determine whether or not to print by controlling the internal air pressure of the cell tube by rotating the air valve.

The liquid level meter and the temperature sensor in the present disclosure may be used as tools for sensing the liquid level and the temperature of the cell liquid. The electric heating sheet and the semiconductor cooling plate are provided as actuators for adjusting the temperature of the cell liquid. The upper cell liquid can reach the bottom liquid tube 12 through the connector 10 and reach the printing nozzle connected externally. The discharge port 16 may generate pressure on the converging sheet 14. The pressure is transmitted to the compression spring 15 through the converging sheet 14. The compression spring 15 is compressed, thereby achieving the purpose of controlling the opening diameter of the printing nozzle. Also, an electric field is generated between the applied electric field electrode sheets on both sides of the discharge port 16, so that the directions of the printing materials such as carbon nanotubes and gold nanorods are consistent, thereby achieving the purpose of controlling the material discharge mode.

The present disclosure will be further described below with reference to the embodiments for a better understanding of the design principle integrating the cell liquid storage device and the printhead.

In the present disclosure, the air valve box 13 is positioned at the top end of the entire cell tube 8. A simple air valve device is designed inside the air valve box 13. The air valve device may include the rotary air valve 21, the air valve straight tube 22, and the air valve gooseneck tube 23. The rotary air valve 21 may be directly connected with the stepping motor. The rotation of the stepping motor can directly drive the rotary air valve 21 to rotate, so that the internal vent tube 6 can communicate with the top vent tube 1 or with outside air. When it communicates with the top vent tube 1, it is in a printing state. When it is rotated 90° counterclockwise, it is connected to outside air and it is in a state where the printing is stopped.

In the present disclosure, the air valve straight tube 22 is linear, and can connect the internal vent tube 6 and the top vent tube 1. The air valve gooseneck tube 23 adopts a design concept of a shape of a gooseneck bottle, which uses a curved three-dimensional elongated space, so that external bacteria and impurities cannot fall into the inside of the cell tube 8 and contamination can be prevented. A stepping motor and a control circuit are incorporated into the stepping motor box 2 above the cell tube 8. The stepping motor has a rotatable end facing upwards and is connected to the designed air valve. The stepping motor may be controlled by an internal single-chip microcomputer such as stm32f103. When the liquid level measured by the liquid level meter 17 at the bottom is too low or when the temperature of the cell liquid is abnormal, the stepping motor rotates to the air valve opening to lower the air pressure inside the cell tube 8 to stop printing. An output signal of the liquid level meter 17 is transmitted to the control circuit in the stepping motor box 2 through the liquid level meter signal line 4. The stepping motor is positioned in the upper part inside the stepping motor box 2, the control circuit is positioned at the bottom inside the stepping motor box 2, and the stepping motor and the stm32f103 single-chip microcomputer power supply lines are externally introduced.

In the present disclosure, the thermometer 18 is inserted from the center of the cell tube rubber plug 7. The thermometer 18 is used for measuring the temperature of the cell liquid in real time and transmitting the temperature information to the stm32f103 single-chip microcomputer to drive the external electric heating sheet 19 and the semiconductor cooling plate 9 to adjust the temperature. It is designed that the electric heating sheet 19 and the semiconductor cooling plate 9 can cooperate to adjust the required temperature of the cells in the cell tube so as to adapt to different kinds of printing cells.

The cell tube 8 in the present disclosure may be made of a glass tube, which is convenient for the requirement of temperature adjustment performed with the external electric heating sheet 19 and the semiconductor cooling plate 9.

The cell tube rubber plug 7 in the present disclosure is used for insulating the cell liquid from the external environment. The internal vent tube 6, the liquid level meter 17 and the thermometer 18 can pass through the cell tube rubber plug 7 as shown in FIG. 1. The internal vent tube 6 penetrates the cell tube rubber plug 7, and its lower part communicates with the cell tube 8 and its upper part is connected with the air valve.

In the present disclosure, the fixing clip 3 fixes the stepping motor box 2 and the air valve box 13 above the cell tube 8. The connector 10 is fixed under the cell tube 8 to connect the bottom liquid tube 12 and the cell tube 8. A vent tube clip is fixed at an upper portion of the bottom liquid tube 12, and is fixed inside the connector 10 through the fixing knob 11. The upper cell liquid can reach the bottom liquid tube 12 through the connector 10 and reach the printing nozzle connected externally. The discharge port 16 generates pressure on the converging sheet 14, and the pressure is transmitted to the compression spring 15 through the converging sheet 14. The compression spring 15 is compressed, thereby achieving the purpose of controlling the diameter of the nozzle opening. Also, an electric field is generated between the applied electric field electrode sheets on both sides of the discharge port 16, so that the directions of the printing materials such as carbon nanotubes and gold nanorods are consistent, thereby achieving the purpose of controlling the material discharge mode.

In the preset disclosure, the nozzle opening diameter may be controlled by a control module. The control module may include three converging sheets 27 and three compression springs 25. The three converging sheets 27 may be closely attached to one another to form an inverted cone with a top opening and are respectively connected with a discharge port 16 through a rotating shaft. The three compression springs 25 may be respectively fixed between the three converging sheets 27 and the inner wall of a nozzle housing.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A printhead device for a 3D bio-printer, comprising: a top vent tube; a stepping motor box; a fixing clip; an internal vent tube; a cell tube rubber plug; a cell tube; a connector; a fixing knob; a bottom liquid tube; an air valve box; a rotary air valve; an air valve straight tube; and an air valve gooseneck tube, wherein:

the cell tube is a cylindrical structure with an opening at the top of the cell tube; the cell tube rubber plug is mounted covering the top of the cell tube in a matching manner and cooperates with the cell tube to form a closed cavity structure for storing cell liquid; a small outlet opening is provided at the bottom of the cell tube; the connector is arranged at an end of the outlet opening; one end of the fixing knob is fixed to the connector and the other end of the fixing knob is connected to a printing nozzle through the bottom liquid tube; the fixing clip is provided on the upper part of the cell tube, the lower portion of the fixing clip is fixed to the side wall of the cell tube, the upper portion of the fixing clip has a horizontal plate-like structure and is positioned above the cell tube rubber plug; the stepping motor box is provided on the upper portion of the fixing clip; the air valve box is arranged on the upper side of the stepping motor box; the rotary air valve is provided in the air valve box, a lower end port of the rotary air valve communicates with the inner cavity of the cell tube through the internal vent tube, an upper end port of the rotary air valve communicates with the air valve straight tube or the air valve gooseneck tube; one end of the air valve straight tube can communicate with the upper end port of the rotary air valve, and the other end of the air valve straight tube communicates with an air pump through the top vent tube; one end of the air valve gooseneck tube can communicate with the upper end port of the rotary air valve, and the other end of the air valve gooseneck tube communicates with the external atmosphere; a rotating part of the rotary air valve is connected with an output end of a stepping motor positioned inside the stepping motor box; the stepping motor drives the rotary air valve to switch the connection port between the air valve straight tube and the air valve gooseneck tube; opening diameter of the printing nozzle is controlled by a control module; the control module includes three converging sheets and three compression springs; the three converging sheets are closely attached to one another to form an inverted cone with a top opening and are respectively connected with a discharge port through a rotating shaft; and the three compression springs are respectively fixed between the three converging sheets and the inner wall of a nozzle housing.

2. The printhead device of claim 1, further comprising: a semiconductor cooling plate and an electric heating sheet, wherein the semiconductor cooling plate and the electric heating sheet are provided at an outer side of the cell tube a liquid level meter and a thermometer, wherein the liquid level meter and the thermometer are provided in the inner cavity of the cell tube; and a controller provided inside the stepping motor box, wherein the controller is connected to the liquid level meter and the thermometer respectively by a liquid level meter signal line and a thermometer signal tube, and the controller is electrically connected to the semiconductor cooling plate, the electric heating sheet, and the stepping motor inside the stepping motor box.

* * * * *